Sept. 19, 1944.   J. F. NELSON ET AL   2,358,730
METHOD FOR FORMING ARTIFICIAL DENTURES
Filed May 26, 1941
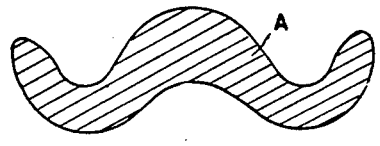
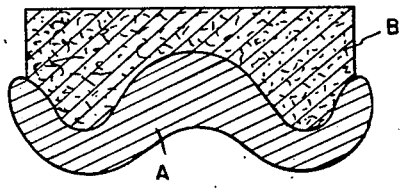
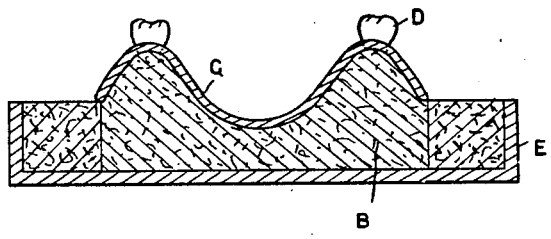
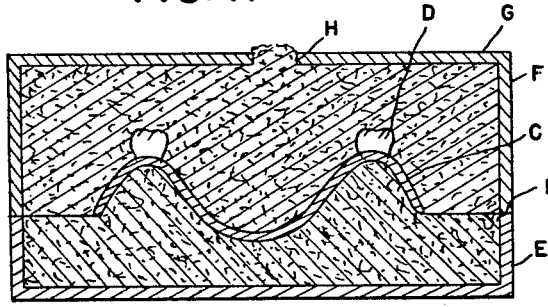
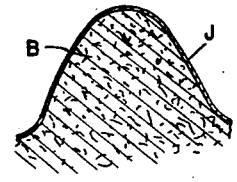
INVENTORS
JOSEPH F. NELSON
HENRY G. NAUSS
ATTORNEYS Patented Sept. 19, 1944

2,358,730

UNITED STATES PATENT OFFICE 2,358,730

METHOD FOR FORMING ARTIFICIAL DENTURES

Joseph F. Nelson, Parsons, Kans., and Henry G. Nauss, Detroit, Mich., assignors to Kerr Dental Manufacturing Co., Detroit, Mich., a corporation of Michigan Application May 26, 1941, Serial No. 395,292

7 Claims. (Cl. 18—55.1)

The invention relates to the manufacture of artificial dentures and more particularly to the process for forming dentures from synthetic resins of the acrylic group, such as the methyl methacrylates, etc.

In the general procedure of forming artificial dentures, an impression is first taken of that portion of the oral cavity which is to receive the denture. From this a cast is made which is an accurate duplicate of that section of the mouth upon which a model of the finished denture is built. A mold is then formed from this model, and the denture material is filled into this mold and cured by a heat treatment.

In the special procedure for forming dentures of the material above referred to, the curing is effected by heat treatment at the temperature of boiling water. It has, however, been found necessary to protect the acrylic resins from direct contact either with moisture or the plaster of the mold; otherwise the natural pink gum color will become permanently discolored and the translucency of the material permanently changed to one of cloudiness, thus making the artificial denture unfit for use. Furthermore, direct contact between the denture material and the plaster or investment material of the mold during the curing process will result in adhesion, so as to render it extremely difficult or impossible to separate the denture therefrom without injury. Thus, in the past it has been the practice to line the mold with tin foil so as to form an impervious wall completely isolating the plaster and moisture from contact with the denture material during the curing process. Such procedure is an expensive, tedious and time-consuming technique and usually can only be correctly done by one with considerable tin-foiling experience.

It is the primary object of the invention to simplify the process by entirely eliminating the tin-foiling operation and substituting therefor a protection which will be equally effective.

With these objects in view, the invention consists in the method and construction as hereinafter set forth.

In the drawing:

Fig. 1 is a cross section through the impression taken of the oral cavity;

Fig. 2 is a similar view showing the cast formed from the impression;

Fig. 3 is a similar view with the cast placed in the bottom section of the flask and showing the wax denture built thereon;

Fig. 4 is a similar view showing both lower and upper sections of the flask and the mold formed therein; and Fig. 5 is an enlarged section of a portion of the mold after the same has been coated to form the impervious surface.

Generally described, our improved method follows substantially the procedure which has heretofore been used in the forming of dentures of the character above described, but with the following differences:

First, the tin-foiling step is omitted;

Second, a film is formed on the inner surface of the mold which is impervious to moisture and is substantially non-adherent to the denture; and Third, the material employed in making the mold is modified to in some respects change its characteristics, particularly in dimensional control and increased friability, which latter facilitates easy removal from the denture.

The impervious film on the inner surface of the mold may be formed in various ways, but in each not requiring any special skill on the part of the operator. One method is to include in the material from which the mold is formed an ingredient which will react with another material subsequently applied to the surface of the mold, to form the impervious film thereon. The latter material is preferably a liquid which can be easily brushed or sprayed over the surface.

Various materials may also be employed for imparting the improved characteristics to the mold. We will, however, describe in detail our improved method, employing certain specific materials as follows:

STEP I

An accurate impression A is first taken of the section of the mouth which is to receive the artificial denture, using for that purpose any suitable impression material such as (a) impression plasters; (b) impression compounds; (c) elastic impression compounds of the hydrocolloid types; etc.

STEP II

From the impression thus taken, an accurate duplicate B of that section of the mouth is made, by pouring into the impression material a fluid compound of the following composition:

(a) A binder—"Hydrocal D"—67% by weight;
(b) A film-forming inorganic salt—ferrous sulphate—20% by weight;
(c) Modifiers—powdered sugar—13% by weight; boric acid—1% to 2% by weight; sodium acetate—.05% or more.

Step III

When the above material has set, an exact wax-duplicate C of the finished denture is built upon it in the usual way, with the teeth D in their proper positions.

Step IV

The model with the wax denture upon it is placed in the center of the bottom half E of a metal curing flask. The bottom half of the flask is then filled with plaster or softer flasking plaster, and the plaster allowed to set.

Step V

The top section F of the flask is next fitted upon the bottom section E, and this section is then carefully filled with the same plaster compound as is Step II. The cover G of the flask is then tightly fitted upon the section F, allowing an excess of plaster to escape through the holes H in said cover. Time is then allowed for the compound in the flask to thoroughly set.

Step VI

The entire flask is now placed in boiling water for about ten minutes, in order to thoroughly soften or melt the wax-duplicate of the finished denture. The flask is then separated into its two sections at the junction I of the bottom and top sections of the flask, and the soft melted wax completely washed out with boiling water.

Step VII

The lingual surfaces of the mold for the finished denture in the top section of the flask are lightly painted with a liquid J (Fig. 5), said liquid being of the following composition:

(a) A film-forming inorganic salt—sodium silicate solution—1 fluid ounce
(b) Modifiers—
  Liquid dryer—½ fluid dram
  Disodium phosphate—19 grains
  Distilled water—3 to 4 c. c.

Step VIII

The palate surfaces of the finished denture in the bottom section of the flask are lightly painted with the same liquid.

Step IX

Sufficient soft denture material is now packed into the mold of the top section of the flask to completely replace the space originally occupied by the temporary wax denture and which was removed by the boiling water. All sections of the curing flask are then fitted together and the complete mold placed into a clamp and tightly closed so as to squeeze out all of the excess denture material. Within the mold all surfaces of the denture material are completely isolated from direct contact with the plaster surfaces and the moisture in the plaster. The tightly clamped flask is then submerged in boiling water for approximately thirty to sixty minutes, the denture material being cured during the heating period.

Step X

After the denture material in the flask has been subjected to the heat of the boiling water for a sufficient length of time to cure it, the flask is removed from the hot water and placed in the cold water for about fifteen minutes, or until cool. It is then opened and the mold carefully broken away from the finished denture. Due to the friable nature of the mold compound, this removal is easily accomplished without injury to the denture.

The specific materials and the precise proportions above specified are not essential and may be varied without departing from the spirit of our invention. Also, the steps as above given may be varied. However, the essential features are:

First, that the surfaces of the mold which come in contact with the denture should be formed with a film which is impervious to moisture;

Second, that this film should be relatively non-adherent to the denture material; and Third, that the mold should be relatively friable while nevertheless possessing sufficient rigidity to accurately reproduce in the denture the form of the wax pattern.

More broadly described, the denture investment powder contains:

(a) A binder which sets hard when mixed with water such as—plaster of Paris, Hydrocals, cements (Portland or high alumina cements), etc.

(b) Inorganic or organic materials which have film-forming properties either when used alone or in combination with other film-forming solutions. Such materials may be as follows—powdered glue or gelatin, powdered casein or albumin, aluminum or calcium stearates, ammonium stearate, aluminum acetate, alum, ferrous sulphate, magnesium fluosilicate, or salts of aluminum, iron, copper, antimony, tin and chromium.

(c) Modifiers—which change or control the setting time of the "investment-mix" or control the consistency and flowing qualities of the investment mix, thus facilitating accurate reproductions of the impression. Such modifiers may be either organic or inorganic materials, such as: sodium acetate, sugar, dextrin, boric acid, borax, etc.

Some other specific formulae are as follows:

Formula No. 2

A. Denture investment powder contains:
  (a) Binders—
    Hydrocal D or plaster of Paris—90-95% by weight
  (b) Film-forming materials (inorganic)—
    White Portland cement or white alumina cement—5-10%
    Aluminum or calcium hydroxide—0.5%-2%
  (c) Modifiers—
    Anhydrous potassium carbonate—0.05-1%
B. Painting liquid:
  (a) Film-forming inorganic salt—
    Solution of magnesium fluo silicate—20° Bé.

Formula No. 3

A. Denture investment powder contains:
  (a) Binder—
    Hydrocal plaster or plaster of Paris—88-98% by weight
  (b) Film-forming materials (organic)—
    Powdered glue or gelatin—1-10%
  (c) Modifiers—
    Gypsum rock—0.1%-2%
    Alum—0.1%-0.5%
B. Painting liquid:
  (a) Solvent—
    Water
  (b) Film-forming materials—
    Potassium bichromate or chrome-alum or tannic acid—5% to saturated solution in the water
    Film formed is then exposed to sunlight for a few minutes.

Formula No. 4

A. Denture investment powder contains:
  (a) Binder—
    (Hydrocal plaster or plaster of Paris)—80-98%
  (b) Film-forming materials (organic)—
    Powdered albumin or casein—1%-10%
  (c) Modifiers—
    Gypsum rock—0.1%-2%
    Alum—0.1%-0.5%
    Alumina cement—1%-5%
    Calcium oxide or caustic soda—0.5%-2%
B. Painting liquid:
  (a) Solvent—
    Water—800 c. c.
  (b) Film-forming material—
    Formaldehyde solution 40%—40-50 c. c., or
    Potassium bichromate—5% to saturated solution in the water.

Formula No. 5

A. Denture investment powder contains:
  (a) Binder—
    Hydrocal plaster or plaster of Paris—79%–96% by weight
    White alumina cement—5–10%
  (b) Film-forming material—
    Aluminum acetate—0.5%–5%
    Alum—0.5%–2%
  (c) Modifiers—
    Gypsum rock—0.5%–2%
    Soluble sodium silicate (dry powd.)—0.1–2%

B. Painting liquid:
  (a) Solvent—
    Water—13 gallons.
  (b) Film-forming material (organic)—
    Soap—5 lbs.

It is not absolutely necessary that one of the film-forming materials should be placed in the investment powder. It is only necessary that one of the materials should be in liquid form so that it can be painted over the surface to be protected and that the other material should be brought in contact with the first. For instance, the two materials which react upon each other can be placed in separate liquids which are successively painted or otherwise applied to the surface of the mold to be protected, thereby forming on said surface a heat-resistant, moisture-impervious film.

What we claim as our invention is:

1. In a process of forming dentures, the steps of incorporating in the mold-forming material one ingredient for forming a moisture-impervious film, forming a denture mold of such material, and coating the inner surface of said mold with a liquid which reacts with the incorporated material to form an impervious film.

2. In a process of forming dentures, the steps of forming a denture mold of a relatively friable material including a chemical reagent, and coating the inner surfaces of said mold with a liquid which reacts with said chemical reagent to form in said surfaces a moisture-impervious film.

3. In a process of forming dentures, the steps of forming a denture mold of a relatively friable material including a chemical reagent, and coating the inner surfaces of said mold with a liquid which reacts with said chemical reagent to form in said surfaces a moisture-impervious film and one which will be substantially nonadherent to the denture.

4. In a process of forming dentures, the steps of incorporating in the mold-forming material an inorganic salt, forming a denture mold of such material, and coating the inner surface of said mold with a liquid which reacts with said salt to form an impervious film.

5. In a process of forming dentures, the steps of incorporating in the mold-forming material a quantity of ferrous sulphate, forming a denture mold of such material, and coating the inner surface of said mold with sodium silicate solution which reacts with said ferrous sulphate to form an impervious film.

6. In a process of forming dentures, the steps of forming a mold of the following compound substantially in the proportion specified:

| | Per cent |
|---|---|
| Hydrocal D | 67 |
| Ferrous sulphate | 20 |
| Powdered sugar | 13 |
| Boric acid | 1 to 2 |
| Sodium acetate | .05 | coating the inner surface of said mold with a liquid comprising:

| | | |
|---|---|---|
| Sodium silicate solution | flu. oz | 1 |
| Liquid dryer | flu. dr | ½ |
| Disodium phosphate | gr | 19 |
| Distilled water | c.c. | 3 to 4 | the reaction between said liquid and ferrous sulphate forming an impervious film.

7. In a process of forming dentures, the steps of successively coating the inner surface of the denture mold with different materials, one containing ferrous sulphate and the other sodium silicate, the said materials reacting with each other to form a moisture-impervious film.

JOSEPH F. NELSON.
HENRY G. NAUSS.